Jan. 31, 1939.   E. P. MARLMAN   2,145,488
TRAP GUN
Filed Feb. 3, 1938

Inventor
Ethel P. Marlman.
By Martin E. Anderson
Attorney

Patented Jan. 31, 1939

2,145,488

UNITED STATES PATENT OFFICE 2,145,488

TRAP GUN

Ethel P. Marlman, Las Animas, Colo., assignor to The Humane Fur Getter, Inc., a corporation of Colorado Application February 3, 1938, Serial No. 188,491

5 Claims. (Cl. 43—84)

This invention relates to improvements in trap guns of the type described and claimed in Patent 2,059,127, granted to me October 27, 1936.

In the patent above identified, a trap gun is shown that is anchored to a stake by a trigger and is so constructed that it will explode when an animal takes the bait.

It has been observed that some predatory animals, especially coyotes, are very curious and suspicious and often dig down about the stake, and during their investigations the trap is frequently moved sufficiently to cause it to explode.

In the present invention the trap gun is anchored in a tube, which is driven into the ground and is attached to the tube by means of a trigger in such a way that the trap gun will be fired when an animal exerts a pull on the bait. The anchoring means is also designed in such a way that the gun, although it is quite readily detachable by proper manipulation, cannot be removed by a direct pull, such as is exerted by an animal taking the bait.

In order to describe the invention so that it can be readily understood, reference will now be had to the accompanying drawing in which it has been illustrated and in which Figure 1 is a side elevation of the trap gun, in assembled condition, and shows the position it occupies relative to the ground;

Figure 1:
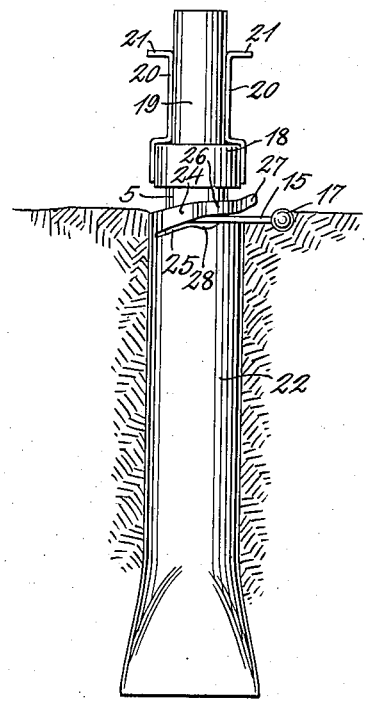

The trap gun is substantially the same as that shown and claimed in the patent above identified and will therefore not be described to any greater extent than necessary for the purpose of explaining the present invention.

The trap gun consists of a cylindrical barrel 5 having its upper end closed by an end wall 6 provided with a central opening 7. The outer surface of the barrel is provided near its top with a threaded section 8. Positioned within the barrel is a firing plunger 9 having its upper end provided with a firing pin 10. The plunger is also provided at its upper end with a flange 11 against which the upper end of the helical compression spring 12 abuts. The spring and the plunger are held in place by means of a disk 13 that is secured to the barrel by having the edge 14 of the barrel crimped about its edge. The spring is always under compression and the upper end of the plunger is in contact with the under surface of the end wall 6 except when the gun is cocked. When the plunger is in released or uncocked position the firing pin extends through the opening 7 and projects a short distance above the upper surface of the end wall.

Figure 4:
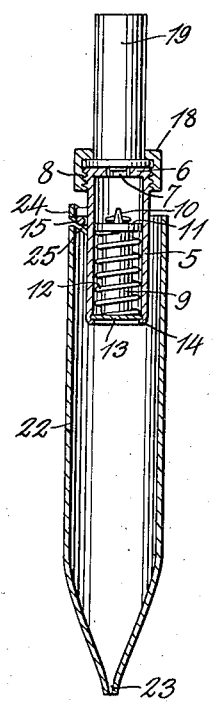
Figure 4 is a longitudinal diametrical section, taken on line 4—4 Fig. 2.
Figure 5:
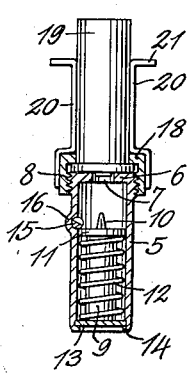
Figure 5 is a section through the trap gun taken on line 5—5 Fig. 2.

In Figs. 4 and 5 the firing plunger is shown in cocked position and it is held in this position by a detent which forms part of the trigger 15. The barrel 5 is provided with a boss 16 having an opening that intersects the inner surface of the barrel along a chord. One end of the trigger is bent at right angles and is inserted through the opening in the boss.

Figure 3:
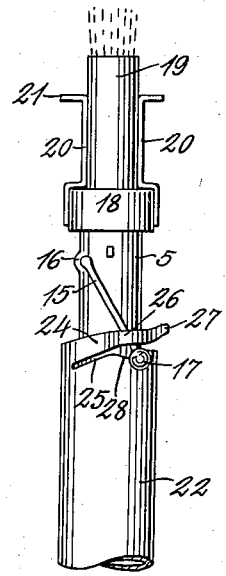
Figure 3 is a fragmentary side elevation, similar to the one shown in Fig. 1 and shows the position of the gun relative to the tubular anchor at or shortly after the moment of firing.

After the trigger is put in place it is moved to the position shown in Fig. 3 and a drill run into the barrel; this cuts a notch in that portion of the trigger that projects into the barrel which permits the firing plunger to move past the trigger. When the gun is to be cocked a pin is inserted through the opening 7 and the plunger moved downwardly until its upper end comes to a position below the trigger and the latter is then turned into the position shown in Figs. 1 and 5, whereupon the plunger will be latched in cocked position. If the trigger is rotated to the position shown in Fig. 3, the plunger is released and is shot upwardly by the action of the spring. The outer end of the trigger is provided with an enlargement 17 for a purpose that will hereinafter appear.

Since the gun is to explode or fire a shell, the latter must be attached to the upper end of the barrel and for this purpose a removable cap 18 is threadedly connected with the upper end of the barrel 5 in the manner shown in Fig. 4. The cap has a central opening of the proper size to receive the shell 19 and is provided with two upwardly extending fingers 20 whose upper ends are bent outwardly to form hooks 21 to which the bait is attached. The shell is provided with the usual primer and this is positioned to be struck and exploded by the firing pin when the plunger is released. The specific trigger and detent shown is illustrative only and any other suitable detent can be used.

This invention relates more particularly to the manner of anchoring the trap gun so that it will not be exploded if a coyote starts digging and otherwise investigating.

The anchoring to the ground is effected by a short piece of pipe 22 whose lower end 23 is closed, preferably by flattening. The upper end of the pipe has a tapering tongue 24 separated from it by a slot 25.

Figure 2:
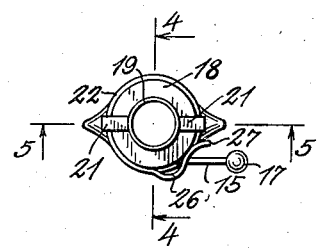
Figure 2 is a top plan view of the trap gun.

The tongue has an outwardly bowed section 26, shown most clearly in Fig. 2, and its free end is preferably outwardly curved as shown at 27. The slot 25 is slightly wider than the diameter of the trigger 15.

After the gun has been cocked the barrel 5 is inserted into the tube and the trigger is inserted into the slot in the manner shown in Fig. 1. The lower edge of the slot is preferably downwardly curved at one point, as indicated at 28, so as to give the trigger some play. After the gun is positioned in the tubular anchor the cap 18 with its shell 19 is put into position. If a pull is now exerted on the gun, raising it from the tubular anchor into the position shown in Fig. 3, the trigger will be turned in the opening in the boss until the notch comes into register with the inner surface of the barrel, whereupon the firing plunger is released and is moved upwardly by the spring, thereby striking the primer and exploding the shell. The enlarged end 17 of the trigger prevents the gun from being pulled out of the anchor. The shell is preferably loaded with a poison compound which is disclosed and claimed in my copending application.

The end 23 of the anchor is preferably open slightly so as to permit water to drain therefrom.

In cold wet climates where the tubular anchor is liable to fill with water and freeze the anchor is preferably filled with vaseline which prevents water from filling the tube and which does not harden sufficiently to keep the gun from being pulled up into firing position.

The slot that separates the tongue 24 from the body of the tube is narrower at the outer end than the diameter of the trigger arm so that an accidental rotary movement will not move the trigger arm out of the slot.

Having described the invention what is claimed as new is:

1. In a trap gun of the type having an outer tubular section adapted to be driven into the ground for anchorage, an inner gun section slidably mounted in the tubular section, and means for attaching bait to the outer end of the gun section, means for interlocking the two sections comprising a trigger pivotally connected with the gun section and extending laterally therefrom, the tubular section having a slot, opening at its upper end and extending in a circumferential direction, for the reception of the trigger, and an enlarged head on the end of the trigger which serves as a stop for limiting the outward movement of the gun.

2. In a trap gun of the type having an outer tubular section adapted to be driven into the ground for anchorage, an inner gun section slidably mounted in the tubular section, and means for attaching bait to the outer end of the gun section, means for interlocking the two sections comprising a trigger pivotally connected with the gun section and extending laterally therefrom, the tubular section having a slot, opening at its upper end and extending in a circumferential direction, for the reception of the trigger, the portion above the slot having its inner surface provided with an outwardly curved notch for receiving the trigger when it is tilted due to the outward movement of the gun section, and an enlarged head on the end of the trigger to serve as a stop for limiting the outward movement of the gun section.

3. A trap gun of the type in which the gun section is positioned partly within a tubular section that serves as an anchor, means for interconnecting the two sections comprising a trigger arm pivotally connected with the gun section and projecting laterally therefrom, the tubular section being provided near its upper end with an inclined slot for the reception of the trigger arm and through which the latter extends, the portion above the slot forming a tongue, the tongue having a portion of its inner surface bowed outwardly to a position outside of the outer surface of the tube, whereby the trigger arm can be rotated in the slot as the gun section is moved outwardly, and means on the end of the trigger arm for engaging the sides of the slot to limit the outward movement of the gun section.

4. An anchor for a trigger gun comprising a tubular member having one end pointed for insertion into the ground, the upper end of the tube having a circumferentially extending tongue separated from the opposed portion of the tube by a slot adapted to receive a trigger arm of a trap gun assembly positioned in the upper end of the tube.

5. An anchor for a trigger gun comprising a tubular member having one end pointed for insertion into the ground, the upper end of the tube having a circumferentially extending tongue separated from the opposed portion of the tube by a slot adapted to receive a trigger arm of a trap gun assembly positioned in the upper end of the tube, the tongue having a portion of its inner surface curved outwardly to a position outside of the outer surface of the tube to provide a pivot point for the trigger.

ETHEL P. MARLMAN.